United States Patent [19]
Nobumoto et al.

[11] Patent Number: 5,880,897
[45] Date of Patent: Mar. 9, 1999

[54] APPARATUS IN USE OF A FILM HAVING INFORMATION RECORDING SECTION

[75] Inventors: Yushi Nobumoto, Amagasaki; Katsuhiro Ono, Sakai; Yoshiyuki Inoue, Izumi; Hiroyuki Miyake, Sakai, all of Japan

[73] Assignee: Minolta Co., Ltd., Osaka, Japan

[21] Appl. No.: 789,807

[22] Filed: Jan. 28, 1997

[30] Foreign Application Priority Data

Jan. 30, 1996 [JP] Japan ..................................... 8-037319
May 30, 1996 [JP] Japan ..................................... 8-136770

[51] Int. Cl.⁶ ....................................................... G11B 5/00
[52] U.S. Cl. ..................................... 360/1; 360/3; 396/310
[58] Field of Search .................................. 360/1, 3, 35.1, 360/69, 137; 396/310, 311, 315, 319, 320

[56] References Cited

U.S. PATENT DOCUMENTS

| | | | |
|---|---|---|---|
| 5,136,318 | 8/1992 | Aoshima | 354/105 |
| 5,258,793 | 11/1993 | Tsuji et al. | 354/288 |
| 5,572,268 | 11/1996 | Tamamura | 396/319 |

*Primary Examiner*—Muhammad N. Edun
*Attorney, Agent, or Firm*—McDermott, Will & Emery

[57] ABSTRACT

An apparatus in use of a film having information recording section, wherein a magnetic head is held with a head guide member which is disposed on a pressure holder, so that the magnetic head could be movable and rotatable in a perpendicular direction to a film plane. When an magnetic recording or reading is executed during a film feeding operation, the magnetic head may keep touching closely with a film plane, thereby an accurate magnetic or recording can be executed.

12 Claims, 13 Drawing Sheets

APPARATUS IN USE OF A FILM HAVING INFORMATION RECORDING SECTION

BACKGROUND OF THE INVENTION

1. Field of the Invention

The present invention relates to an apparatus, such as a camera, having a function of recording information, which records an image on a film having a magnetic recording section, and a scanner which reads out an image recorded on a film and the like.

2. Description of the Prior Art

There has been provided a camera, which employs a film having a magnetic recording section, writes various photographing information on the magnetic recording section by a magnetic head installed on the camera, and reads out the photographing information as necessity requires. In such a camera, it has been known that the camera employs a film cartridge in a thrusting system, which feeds out a film contained in a cartridge by a spool rotation.

In such a camera which a film cartridge is loaded, it is unnecessary to pull out a film's lead portion from the cartridge and wind it around a sprocket, therefore, it does not need to arrange a function of opening of a back lid such as a conventional camera. Accordingly, a backside of an exposure part of a film may covered with a fixed member, and it is able to simplifies the structure by fixing a pressure plate, which has been disposed on a back lid conventionally and restricts a position of a film surface sandwiching the film, to the camera body. There has been a camera which a magnetic head is installed on a pressure plate such as above in order to install a magnetic head for magnetic recording on a magnetic recording section of a film (refer to U.S. Pat. No. 5, 136, 318).

While, in a camera such as above-mentioned, it is necessary to consider so that a relative position of a magnetic recording section and a magnetic head would not slanted for executing an accurate magnetic recording since the magnetic recording and reading is executed during a film feeding operation. Then, in a construction that a magnetic head is installed on a pressure plate in itself, which restricts a position of a film surface as shown in the above-mentioned Japanese Patent Gazette, the shape of the pressure plate in itself and a structure of installing the pressure plate on a camera is complex. Further, such as the structure that a magnetic head is installed on a pressure plate in itself, a posture of a magnetic head installation has less flexibility, and magnetic substance is applied on a less pliable film, thus, the magnetic head may not keep touching closely with a film surface.

SUMMARY OF THE INVENTION

The present invention is made to solve the above-mentioned problems, and an object is to provide an apparatus having a function of recording information using a film with a recording section, wherein the apparatus has a structure that a magnetic head is not installed on a pressure plate in itself for simplifying a structure of the pressure plate, besides, it has a structure that a magnetic head may be installed more flexibly and it is able to keep touching closely with a film plane sufficiently, and it is able to execute an accurate magnetic writing and reading.

In order to accomplish the above-mentioned object, the apparatus in use of a film having information recording section comprises; a pressure plate which restricts a position of a film plane sandwiching it with a camera body, a pressure plate holder which holds the pressure plate, a magnetic head which executes a magnetic recording on the film, a head guide member which holds the magnetic head so as to be movable for the film plane direction.

In the above construction, the magnetic head is arranged so as to be movable in a perpendicular direction to a film plane for the pressure plate holder through the head guide member, thus, it is able to improve a touching state of the magnetic head and the film plane. Further, as the magnetic head is not disposed on the pressure plate in itself, the pressure plate unit does not have a complex construction.

DETAIL DESCRIPTION OF THE PREFERRED EMBODIMENTS OF THE INVENTION

Figure 1:
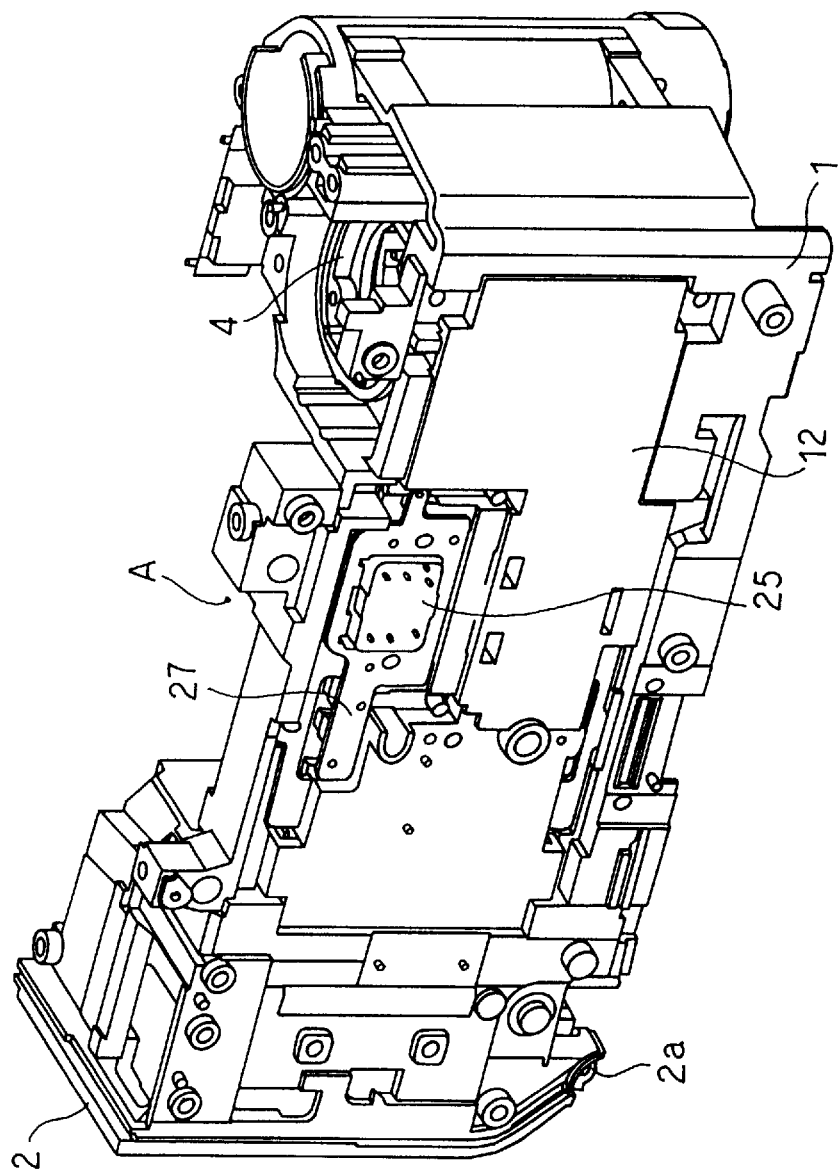
FIG. 1 is a perspective backside view showing a camera body according to an embodiment of the present invention.

The first embodiment according to the present invention will be now explained referring to the drawings.

Figure 2:
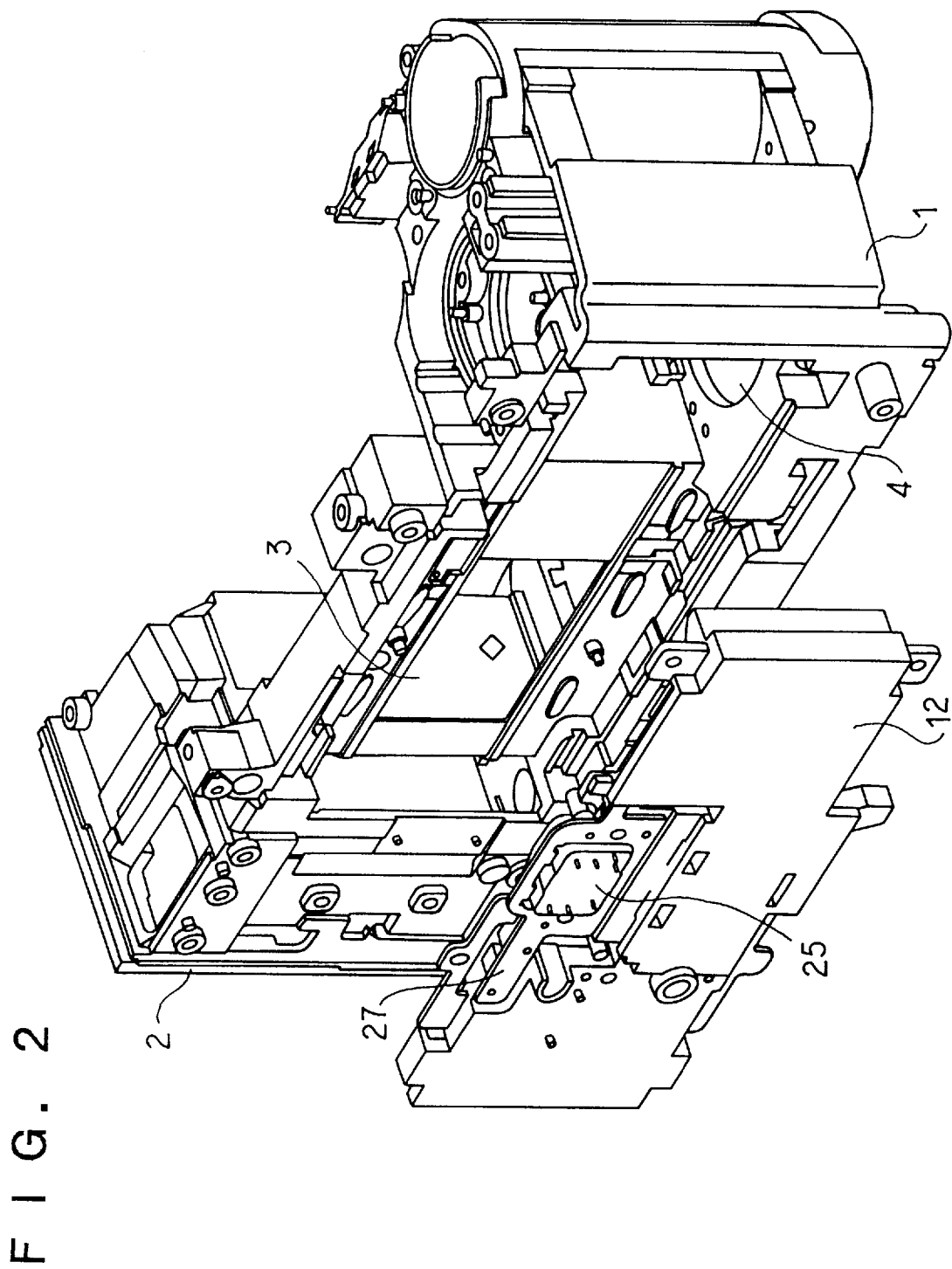
FIG. 2 is a perspective backside view showing a camera body in a state that a pressure plate holder arranged backside of the cameras is removed.

FIG. 1 is a perspective backside view showing a camera body that is a frame wherein a cover and the like are removed from the camera using a film with information recording section, and FIG. 2 is a perspective view showing a state that a pressure plate holder is removed from the camera body. The camera employs a film having a magnetic information recording section, and feeds out the film by rotation of a spool, that is, a camera wherein a film cartridge in a thrust feeding system is loaded. At a camera body 1, a cartridge chamber 2, wherein a film cartridge is loaded, is arranged at its one side, an aperture 3 for exposing is arranged at the center part, and a spool chamber 4 is arranged at the other side. A photographing lens, a shutter and the like are disposed in a space A in front of the aperture 3, and structures for film feeding are arranged below the aperture 3. Further, a cover case (not shown) is to be fixed surrounding the camera body 1. The cartridge chamber 2 is constructed to be able to rotate around a shaft 2a of a lower end position so that a film cartridge can be loaded inside thereof.

A pressure plate holder 12, which is made of resin and holds a pressure plate for regulating a film surface position, is arranged backside of the camera body 1. The pressure plate holder 12 is fixed to the camera body 1 as to sandwich the pressure plate 11 (FIG. 3) with the camera body 1 facing the aperture 3 for exposing. Further, on the pressure plate holder 12, a magnetic head 25, which inputs and outputs photographing information magnetically on a magnetic recording section of a film, is arranged in an attaching state to the film surface direction so as to be movable and rotatable for the film surface through a holder plate 27 etc. It will be explained later in detail.

Figure 3:
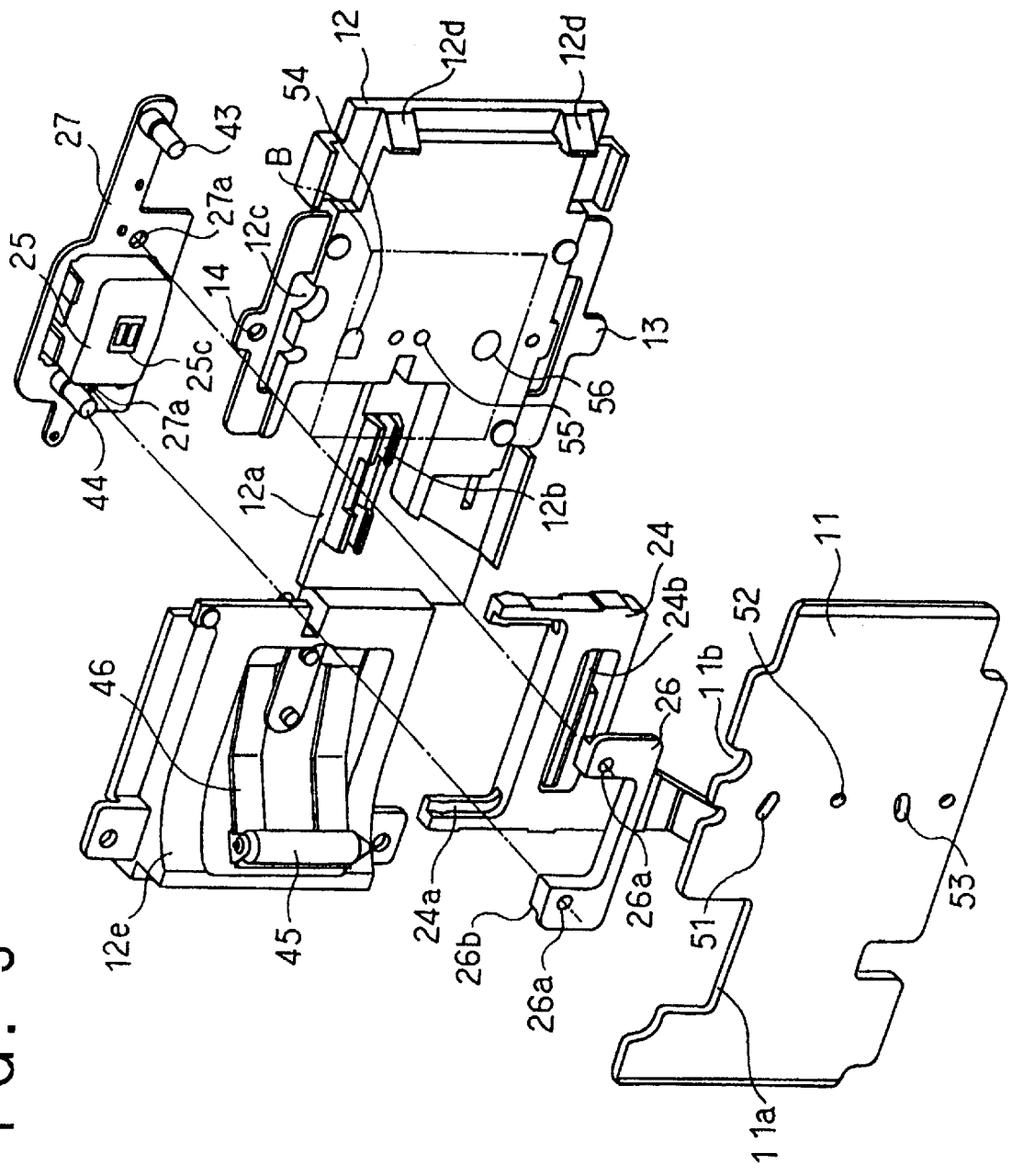
FIG. 3 is a perspective front view showing the pressure plate holder and a pressure plate.
Figure 4:
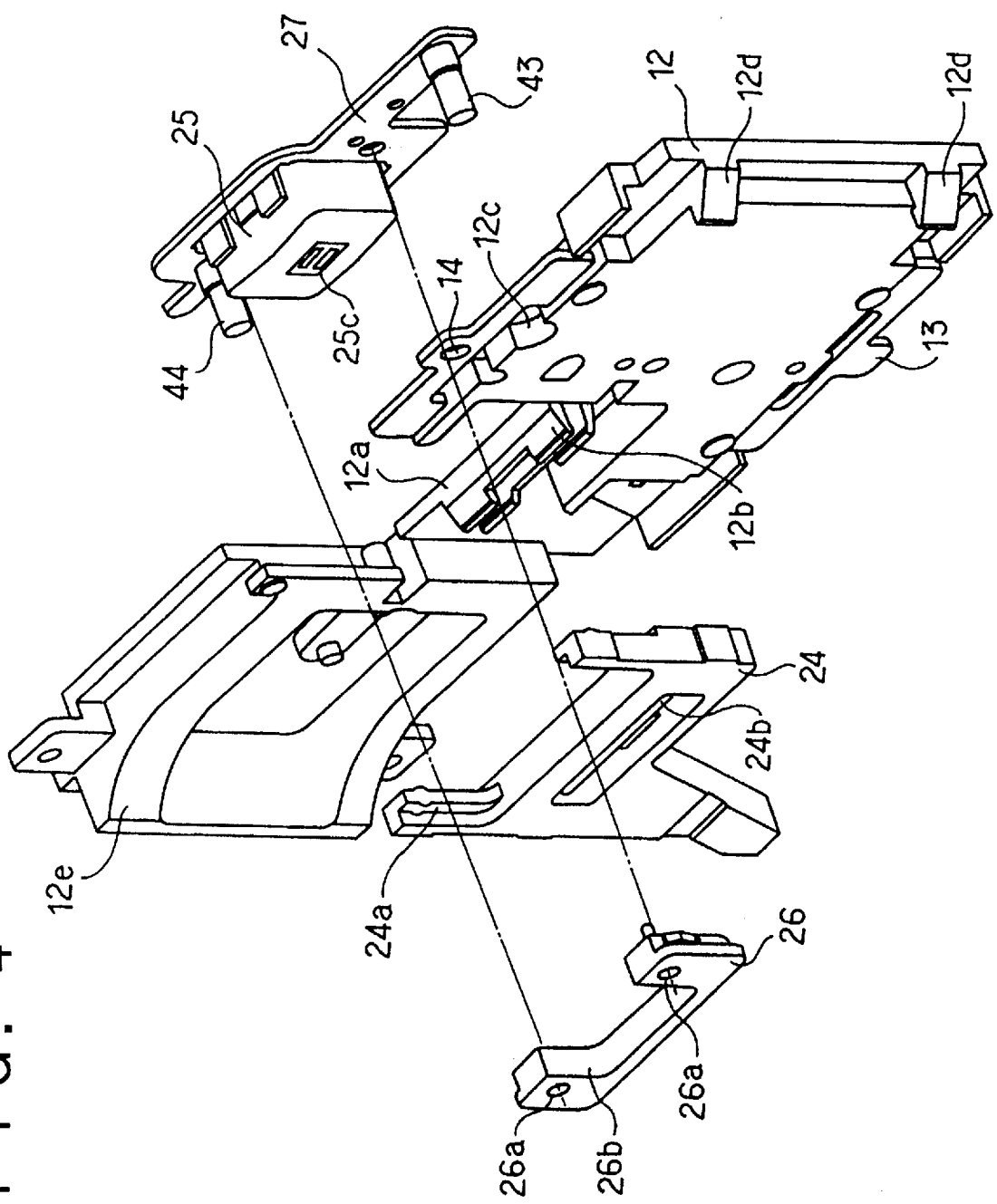
FIG. 4 is a perspective front view showing the pressure plate holder.

FIG. 3 and FIG. 4 are perspective front view showing the pressure plate holder 12. The pressure plate holder 12 holds a pressure plate 11 made of metals, which sandwiches a film with the camera body 1 and regulates the film plane position. The pressure plate holder 12 is fixed to the camera body 1 by inserting a hook 13, which is formed on a lower position, into a hole formed on a lower backside position of the camera body 1, and by screwing using a screw hole 14 and the like at the upper end portion of the holder.

Now, a construction that a unit of a magnetic head 25 is mounted so as to be movable and rotatable on the pressure plate holder 12 will be explained. On the pressure plate holder 12, an aperture 12a is formed where the magnetic head 25 is fixed, and installation unit 12b for fixing the magnetic head 25 in a rotatable state is arranged inside and just under the aperture 12a. The unit of magnetic head 25 is composed of a head guide member 24, a holder plate 27 with the magnetic head 25, and a head holder 26, those of which are engaged each other by sandwiching the head guide member 24 therefrom both front and backside. The holder plate 27 and the head holder 26 are engaged by penetrating screws (not shown) into each screw holes 27a and 26a. The engaged unit is able to slide vertically within a predetermined scope by guiding a projected portion 26b of the head holder 26 into a recess portion 24a of the head guide member 24. A shaft 24b, which is to be engaged with the installation unit 12b, is arranged at the head guide member 24. The unit of the magnetic head 25 is provided to be movable to the pressure plate holder 12 through the aperture 12a, and biased to a film surface direction, by engaging the shaft 24b of the head guide member 24 with the installation unit 12b. A film contact surface 25c of the magnetic head 25 is able to touch the magnetic recording section on a film surface in order to execute a magnetic recording through an aperture 11a of the pressure plate 11 (refer to FIG. 3).

On the holder plate 27, pins 43 and 44 for guiding a fed film are arranged as guide members. These pins 43 and 44 are protruded to a film feeding path through a hole 12c, the aperture 12a formed on the pressure plate holder 12, a hole 11b and an aperture 11a of the pressure plate 11, and follow along to an upper edge portion of the fed film. In this manner, it is constructed so that the magnetic head 25 can touch to the edge portion of the film at a fixed distance position and record a photographing information magnetically at a same height position.

On the pressure plate holder 12, a holder 46 having a pressure roller 45, which prevents loosening of a film to be wound up to a spool in a spool chamber 4, is fixed. Further, a guide slope 12d and a curved guide plane 12e for guiding a film is formed integrating with the pressure plate holder 12. Also, holes 51, 52, and 53 are arranged for detecting and adjusting a shutter speed on the pressure plate 11, and holes 54, 55, and 56 are arranged on the pressure plate holder 12 corresponding to the above holes 51, 52, and 53. It will be explained later in detail. Here, a frame B shown in a broken line in FIG. 3 shows an area which corresponds to the aperture 3 of the camera body 1.

A camera according to the above-mentioned embodiment, wherein the unit of magnetic head 25 is mounted on the pressure plate holder 12 to be rotatable through the head guide member 24, besides to be movable within a predetermined scope to a film surface direction, therefore, it is able for the magnetic head 25 to contact constantly with the film surface and it is also able to execute an accurate magnetic recording and the like.

Figure 5:
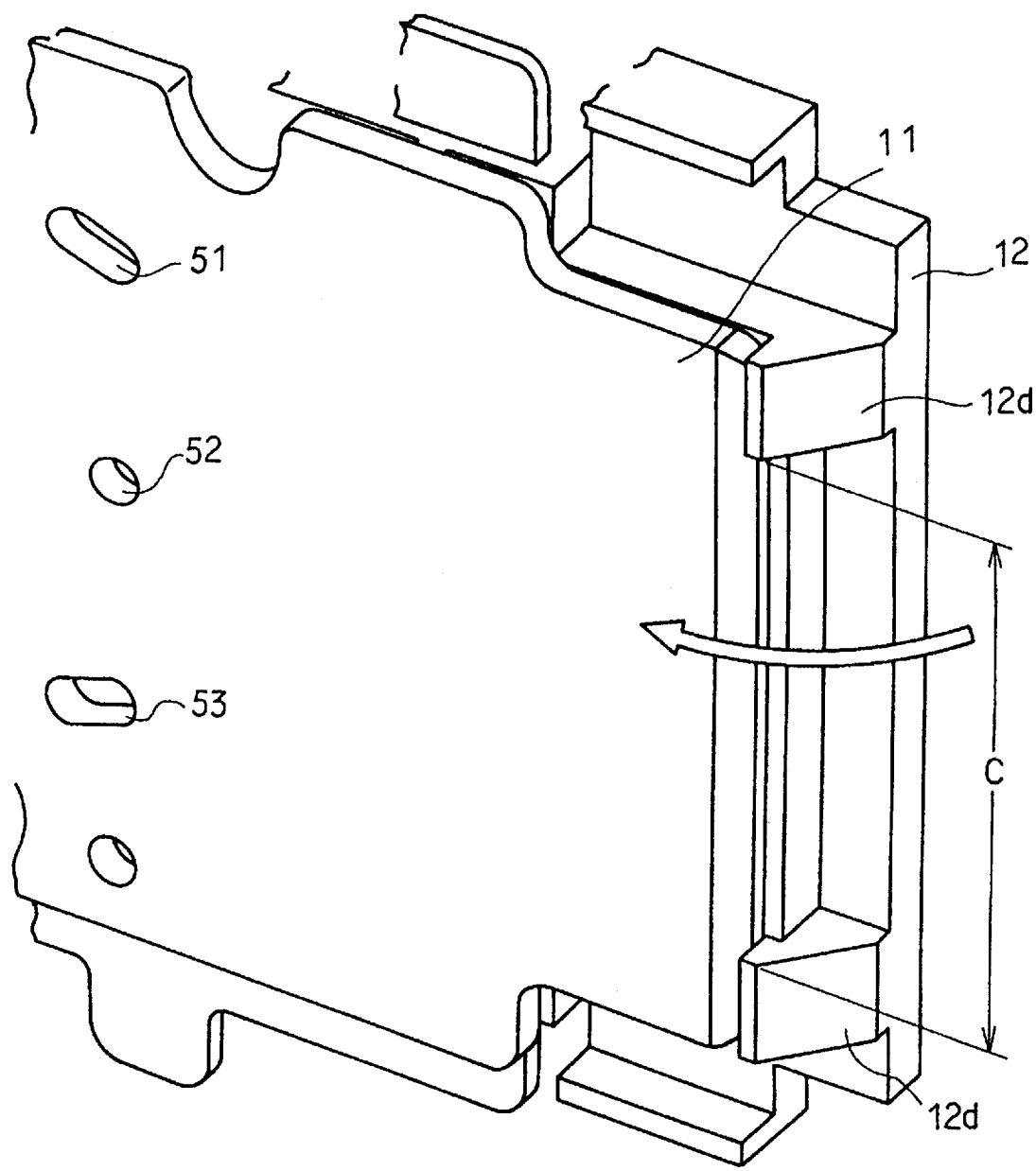
FIG. 5 is a partial perspective front view showing the pressure plate holder and the pressure plate.

FIG. 5 is a partial perspective front view showing the pressure plate holder 12 and the pressure plate 11. On the pressure plate holder 12, a guide slope 12d to be a gate is formed unitedly, which guides a film being thrust from the film cartridge to a gap between the pressure plate 11 held on the pressure plate holder 12 and the camera body 1. The guide slope 12d is formed on upper and lower position of a film becoming of the pressure plate holder 12, arranging separately at a predetermined interval C which is wider than a photographing area of the film, and the height of the guide slope 12d is almost the same size with a thickness of the pressure plate 11 held on the pressure plate holder 12, and, an edge portion of the guide slope 12d in the pressure plate 11 has a R-shape so that a lead portion of a thrust film will not stick but feed smoothly. Since the guide slope 12d is arranged separately at the interval C and is constructed such that members touching with a film will not project out within a scope of the interval C, scratching of a photographing area of a film, which is fed and guided as shown by an arrow is prevented. Moreover, since the guide slope 12d can be disposed unitedly on the pressure plate holder 12, which is molded from resin material and the like, it is manufactured easily, further, a structure of the pressure plate 11 can be simplified in itself by providing such guide slope 12d.

Figure 6:
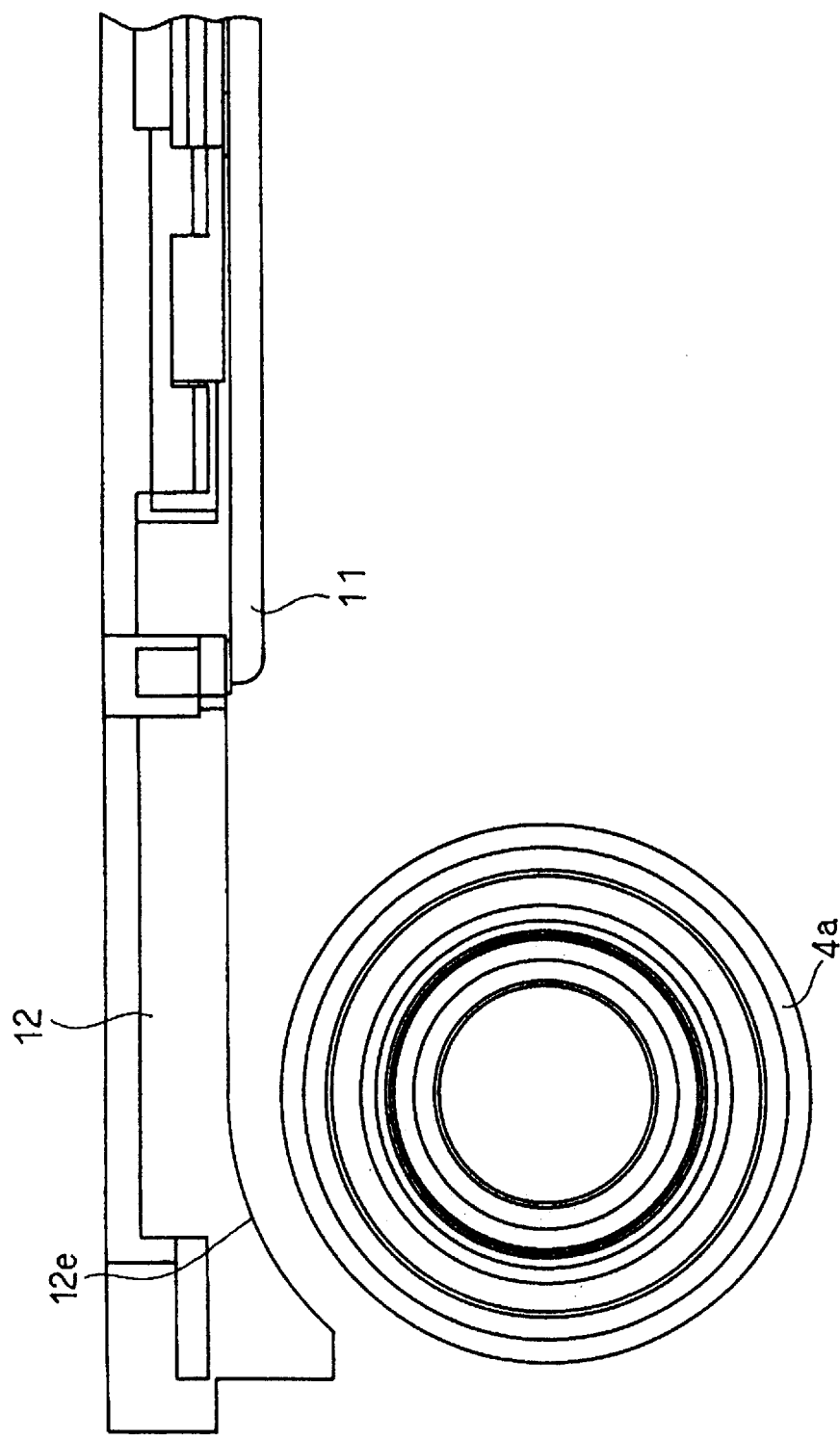
FIG. 6 is a top view showing a spool chamber side of the pressure plate holder.

FIG. 6 is a top view showing a spool chamber side of the pressure plate holder 12. At the side of the spool chamber 4 (refer to FIG. 1 and FIG. 2)of the pressure plate holder 12, a curved guide plane 12e for guiding a film to a winding spool 4a disposed inside of the spool chamber 4 is formed in a unit with the pressure plate holder 12. By forming the curved guide plane 12e in a unit with the pressure plate holder 12 in this manner, it is able to reduce the number of members and installing process compared with a case that a guide member is arranged separately. Moreover, as the pressure plate holder 12 is not fixed to a back lid of a camera as a conventional manner, but it is fixed to the camera body 1, a more accurate positioning of the curved guide plane 12e to the winding spool 4a is achieved.

Figure 7:
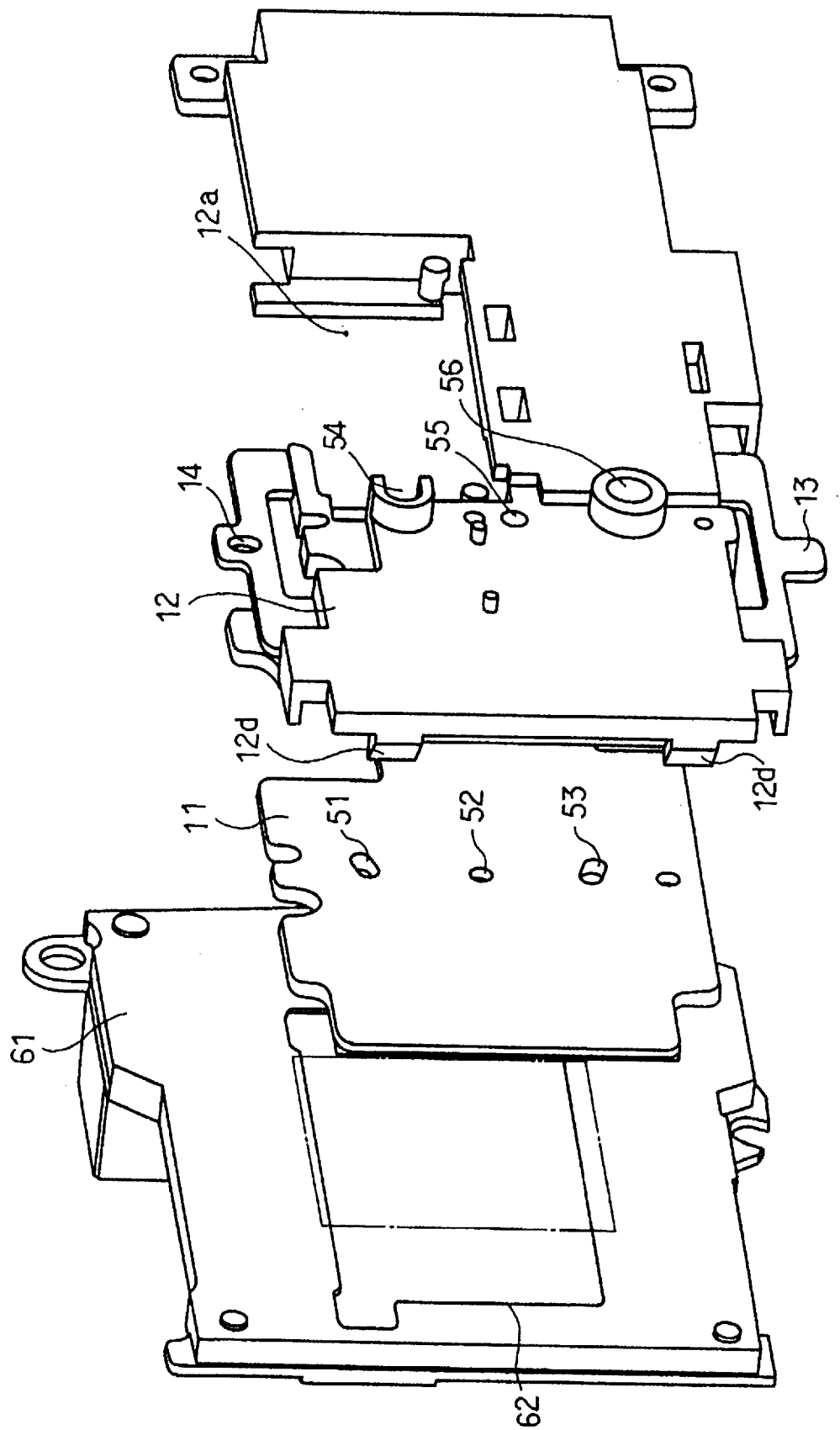
FIG. 7 is a decomposed perspective backside view showing the pressure plate and the pressure plate holder and a shutter disposed in front of them.

FIG. 7 is a decomposed perspective view showing backside of the pressure plate 11, the pressure plate holder 12, and a shutter arranged in front of them. The shutter 61 is arranged in a space A so that an aperture 62 corresponds to an aperture 3 of the camera body 1 (FIG. 1), and an exposing time is controlled by a vertical moving of a slit formed by built-in shutter curtains in the aperture 62. The above-mentioned holes 51, 52, and 53 disposed on the pressure plate 11, and holes 54, 55, and 56 corresponding the above on the pressure plate holder 12 are positioned on a light measurement point in a running direction of the shutter curtain in an area corresponding to the aperture 62. Further, at the backside of the pressure plate holder 12, a main flexible plate having an electric circuit is installed (not shown), and holes are formed on the plate, too at a position corresponding to the above-mentioned holes. There holes are arranged for detecting a shutter speed in order to adjust the shutter curtain speed.

A shutter curtain speed is detected by arranging a shutter speed examining device (not shown) at backside of the pressure plate holder 12 and backward of the main flexible plate, actuating the shutter, and then detecting a timing of an incident light coming through the holes 51 and 54, holes 52 and 55, and holes 53 and 56 at that point. Since there are three points for detecting an incident light in a running direction of the shutter curtain, it is able to examine a movement of the whole shutter curtain. It is also possible to detect it if there are two points for light measurement at least. As a shutter curtain speed detection is constructed in this manner, it is able to detect the shutter curtain speed without putting off the pressure plate 11, the pressure plate holder 12 and the main flexible plate. Further, as it is able to detect the shutter curtain speed without touching the main flexible base plate, it is possible to execute the shutter curtain speed detection in the latter manufacturing process of the camera. Supposed that the pressure plate 11 needs to be put off in order to execute the above-mentioned shutter curtain speed detection, it may be troublesome to dispose the pressure plate 11 accurately again. According to the present invention, such a problem does not occur.

Now, a second embodiment of the present invention will be now explained referring to the drawings.

Figure 8:
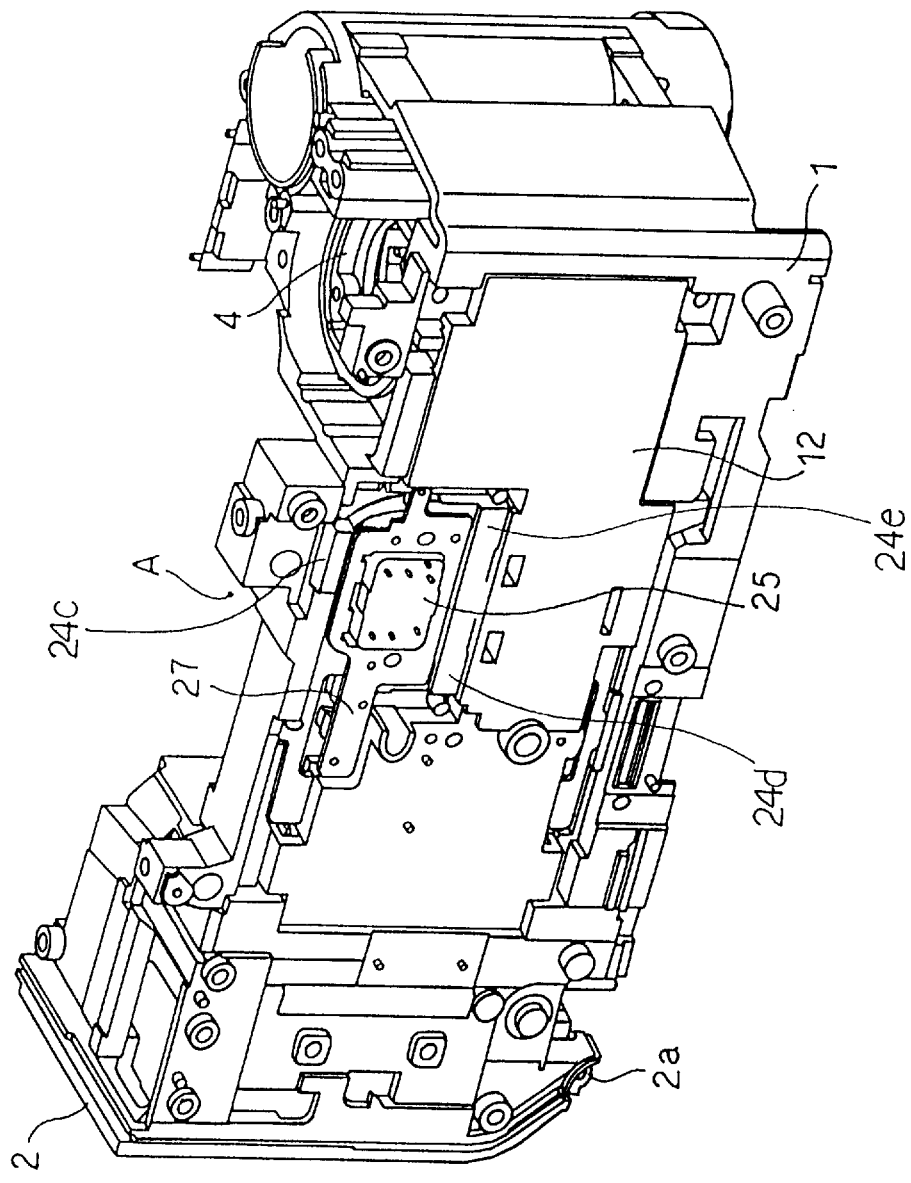
FIG. 8 is a perspective backside view showing a camera body according to the second embodiment of the present invention.
Figure 9:
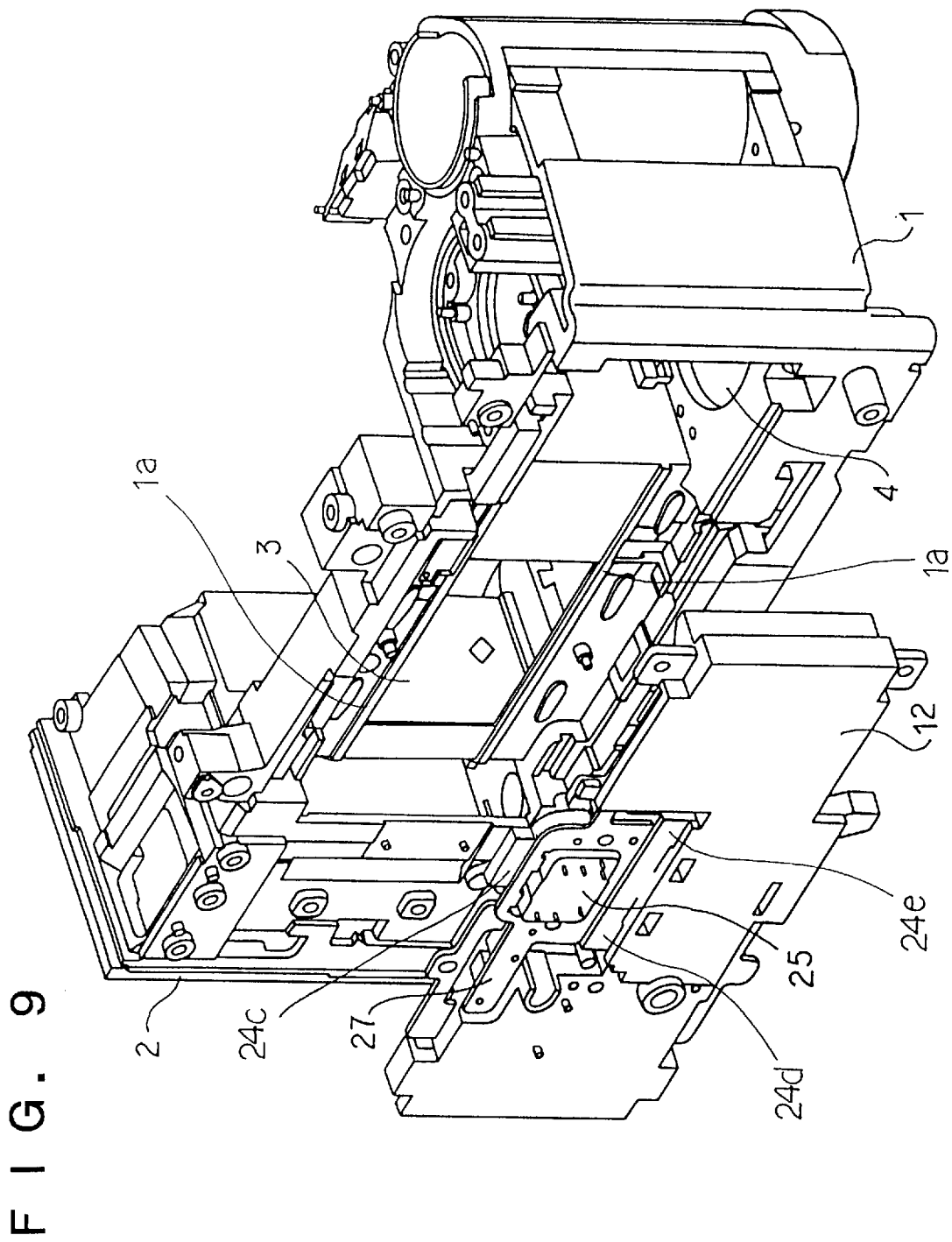
FIG. 9 is a perspective backside view showing a camera body in a state that a pressure plate holder arranged backside of the cameras is removed.

FIG. 8 is a perspective backside view showing a camera body that is a frame wherein a cover and the like are removed from the camera using a film with information recording section, and FIG. 9 is a perspective view showing a state that a pressure plate holder is removed from the camera body. The camera employs a film having a magnetic information recording section, and feeds out the film by rotation of a spool, that is, a camera wherein a film cartridge in a thrust feeding system is loaded. At a camera body 1, a cartridge chamber 2, wherein a film cartridge is loaded, is arranged at its one side, an aperture 3 for exposing is arranged at the center part, and a spool chamber 4 is arranged at the other side. A photographing lens, a shutter and the like are disposed in a space A in front of the aperture 3, a rail plane 1a for positioning a film is arranged at upper and lower edge of the aperture 3 for exposing, and structures for film feeding are arranged suitably below the aperture 3. Further, a cover case (not shown) is to be fixed surrounding the camera body 1. The cartridge chamber 2 is constructed to be able to rotate around a shaft 2a of a lower end position so that a film cartridge can be loaded inside thereof.

A pressure plate holder 12, which is made of resin and holds a pressure plate 11 (FIG. 8) for regulating a film plane position cooperating with the rail plane 1a formed on the camera body 1, is arranged backside of the camera body 1. The pressure plate holder 12 is fixed to the camera body 1 as to sandwich the pressure plate 11 with the camera body against the aperture 3 for exposing. Further, on the pressure plate holder 12, a magnetic head 25, which inputs and outputs photographing information magnetically on a magnetic recording section of a film, is arranged in an attaching state to the film surface direction so as to be movable and rotatable for the film surface through a holder plate 27 etc. It will be explained later in detail.

Figure 10:
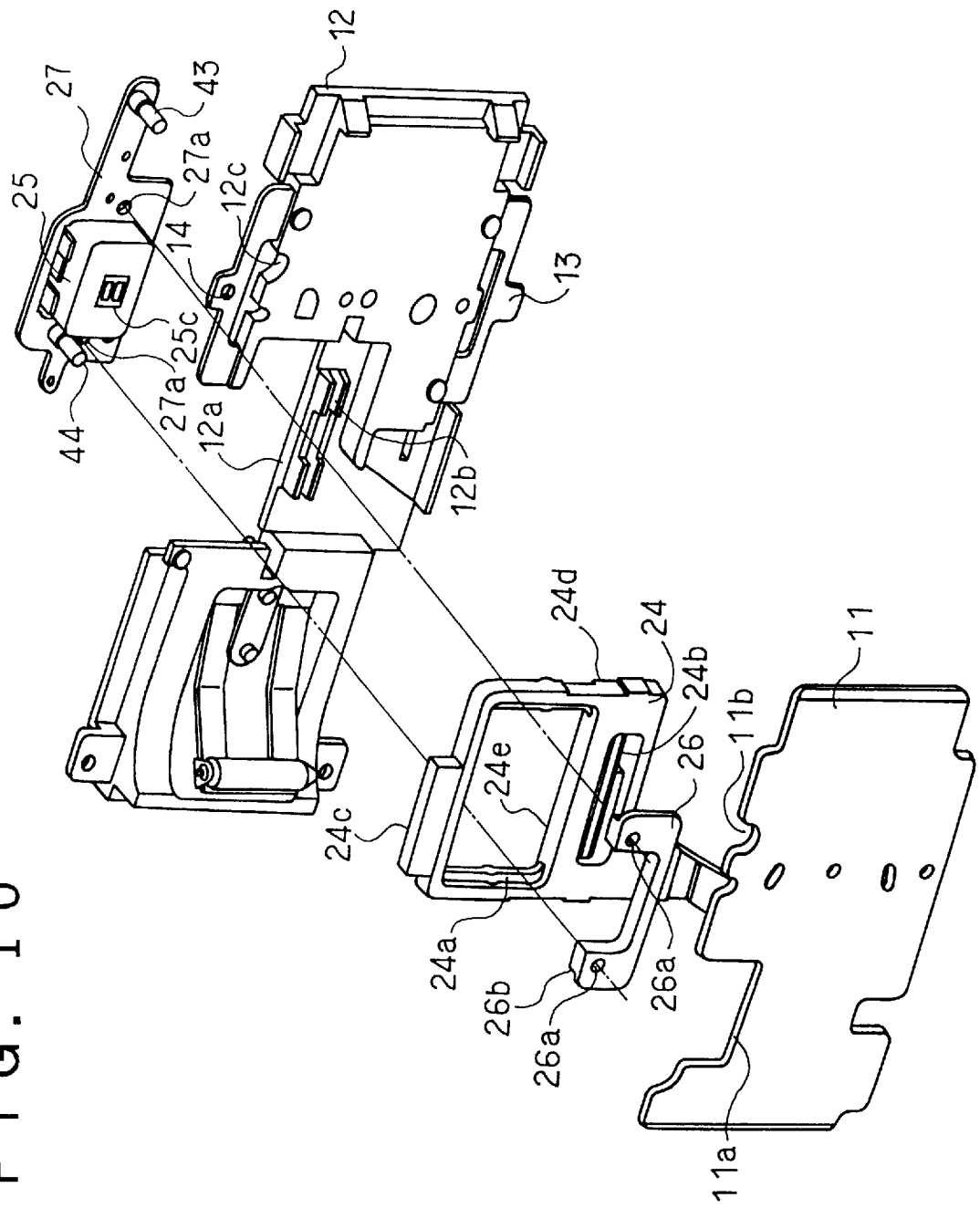
FIG. 10 is a perspective front view showing the pressure plate holder according to the second embodiment of the present invention.
Figure 11:
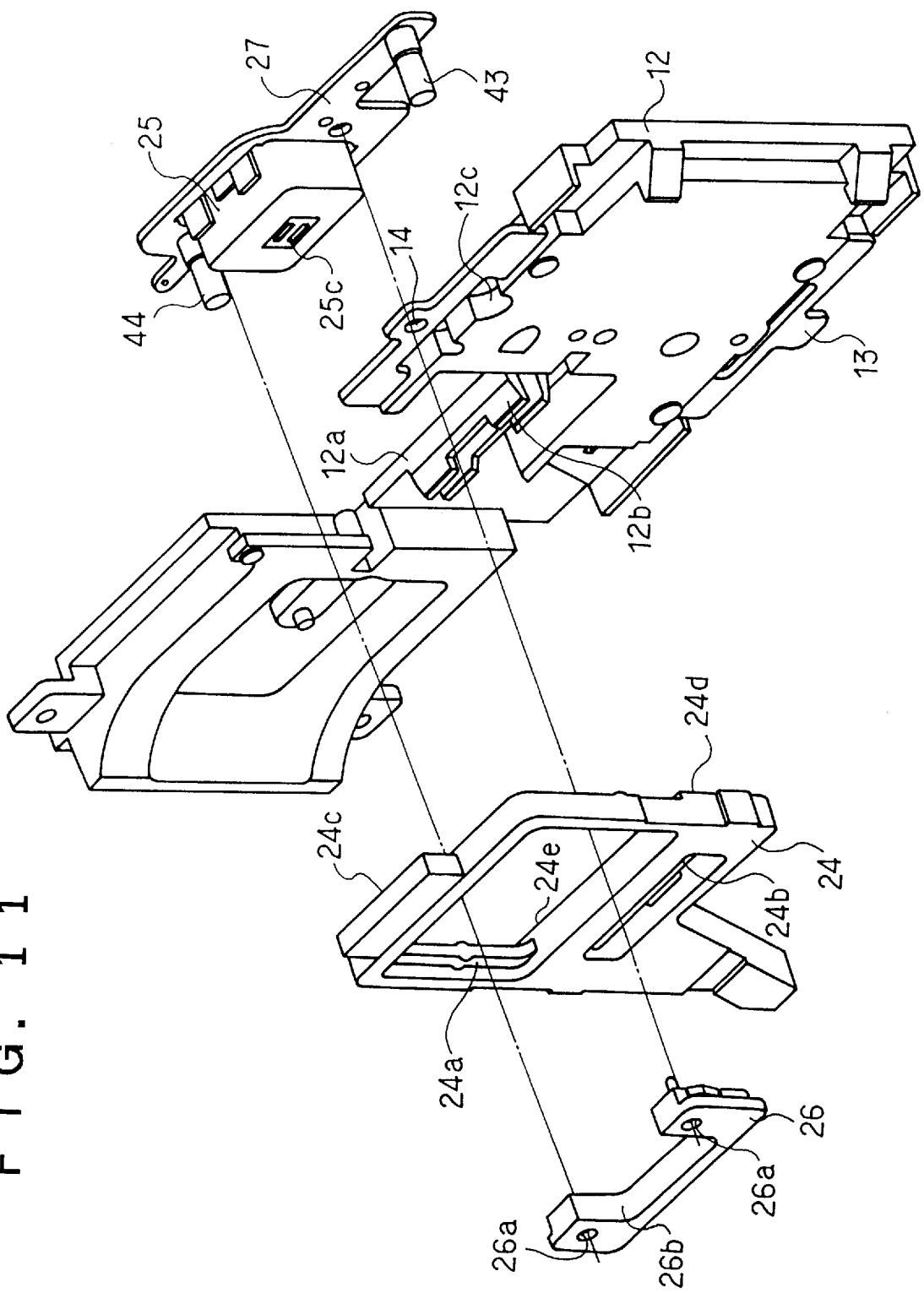
FIG. 11 is a perspective front view showing the pressure plate holder.

FIG. 10 and FIG. 11 are perspective front view showing the pressure plate holder 12. The pressure plate holder 12 holds a pressure plate 11 made of metals, which sandwiches a film with the camera body 1 and regulates the film plane position. The pressure plate holder 12 is fixed to the camera body 1 by inserting a hook 13, which is formed on a lower position, into a hole formed on a lower backside position of the camera body 1, and by screwing using a screw hole 14 and the like at the upper end portion of the holder. The pressure plate holder 12 presses the pressure plate 11 biasing to the camera body 1 caused by an elastic deformation of a connected area with the camera body 1.

Now, a construction that a unit of a magnetic head 25 is mounted so as to be movable and rotatable on the pressure plate holder 12 will be explained. On the pressure plate holder 12, an aperture 12a is formed where the magnetic head 25 is fixed in the pressure plate holder 12, and installation unit 12b for fixing the magnetic head 25 in a rotatable state is arranged inside and just under the aperture 12a. The unit of magnetic head 25 is composed of a head guide member 24, a holder plate 27 with the magnetic head 25, and a head holder 26, those of which are engaged each other by sandwiching the head guide member 24 therefrom both front and backside. The holder plate 27 and the head holder 26 are engaged by penetrating screws (not shown) into each screw holes 27a and 26a. The engaged unit is able to slide vertically within a predetermined scope by guiding a projected portion 26b of the head holder 26 into a recess portion 24a of the head guide member 24. A shaft 24b, which is to be engaged with the installation unit 12b with a predetermined play, is arranged at the head guide member 24. The unit of the magnetic head 25 is provided to be movable to the pressure plate holder 12 through the aperture 12a, and biased to a film surface direction, by engaging the shaft 24b of the head guide member 24 with the installation unit 12b. Then, as the connected are has a predetermined extent in a perpendicular direction with a film plane in a state that the shaft 24b is connected with the attachment 12b.

Figure 12:
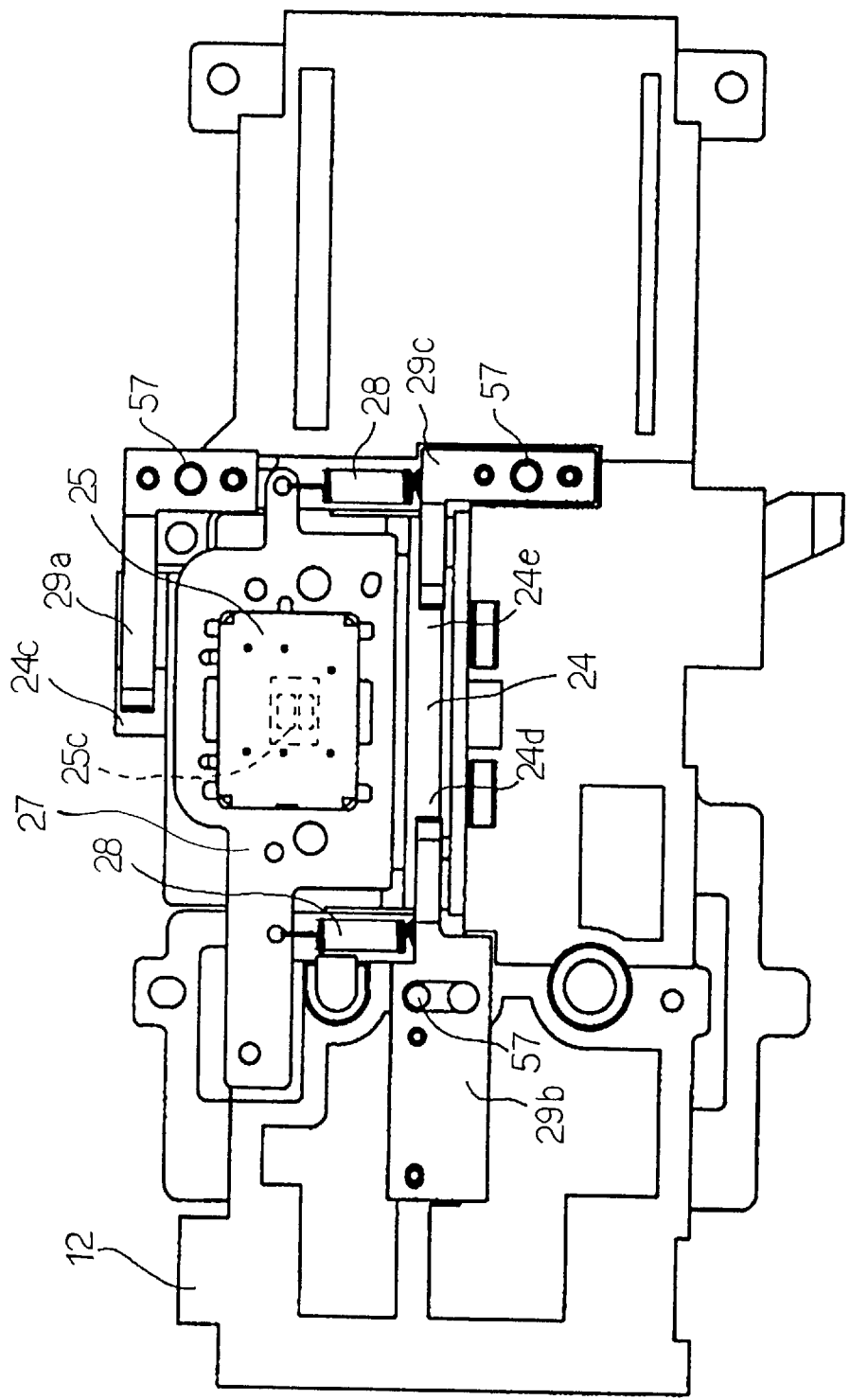
FIG. 12 is a backside view showing the pressure plate holder.

On the holder plate 27, pins 43 and 44 are arranged as to guide the magnetic head 25 to a predetermined position from an edge of a fed film. FIG. 12 is a backside view of the pressure plate holder 12. A spring 28 for pressing the holder plate 27 to lower direction in the figure is disposed on the holder plate 27, of which one end portion is attached with the pressure plate holder 12. Accordingly, the pins 43 and 44 are protruded to a film feeding path through a window 12c, the aperture 12a formed on the pressure plate holder 12, a window 11b, an aperture 11a on the pressure plate 11, and being along with the upper edge of a fed film by being pressed with the spring 28. Then, the magnetic head 25 attaches with a film edge in a predetermined distance so that it is able to execute a magnetic recording on the same position from the film's upper edge.

The magnetic head 25 is biased to press a film surface in a perpendicular direction thereto by pressing pressed parts 24c, 24d, and 24e of the head guide member 24 with three springs 29a, 29b, and 29c installed on the pressure plate holder 12 for pressing the magnetic head. The magnetic head 25 is able to contact with a film for magnetic recording on magnetic recording section on the film surface through the aperture 11a (refer to FIG. 10) of the pressure plate 11.

In the springs 29a, 29b, and 29c for pressing magnetic head, its one ends are fixed to an attachment hole 57 formed on the pressure plate holder 12 with screws (not shown) and the like. The other free ends of the springs 29a, 29b, and 29c, which is not fixed, are pressing respectively the pressed parts 24c, 24d, and 24e on the head guide member 24 as mentioned before, and a relation of the pressed positions will be explained hereinafter.

At an contacting plane with a film of the magnetic head 25, there is a core portion 25c having an exposed structure for magnetic data writing and reading. The pressed parts 24c, 24d, and 24e are arranged in a state that they are in symmetry against a perpendicular line to a film feeding direction passing through the core portion 25c of the magnetic head 25. Therefore, as a balance of right and left (pitch direction) is stable, a film surface and the core portion 25c of the magnetic head 25 are touching constantly, and it is able to execute preferable magnetic writing and reading. Further, by arranging the core portion 25c of the magnetic head 25 in a center of a gravity of a shape linking the pressed parts 24c, 24d, and 24e, a film surface and the core portion 25c of the magnetic head 25 can contact stably, then it is able to execute favorable magnetic writing and reading. When the pressing forces by a plural springs are different mutually, the magnetic recording unit may be arranged in a position where an integrated pressing force by the pressing springs interacts.

Furthermore, adherence condition of the magnetic head 25 and a film surface is improved by changing an amount of force between the springs 29a, 29b, and 29c for pressing magnetic head. Generally, a restitution caused by film's curing becomes bigger around the center portion of shorter side of a film. For example, the restitution caused by film's curing is killed by increasing the amount of force of the springs 29b and 29c for pressing magnetic head, and therefore, it leads to a stable posture of the magnetic head 25 in its rolling direction.

Figure 13:
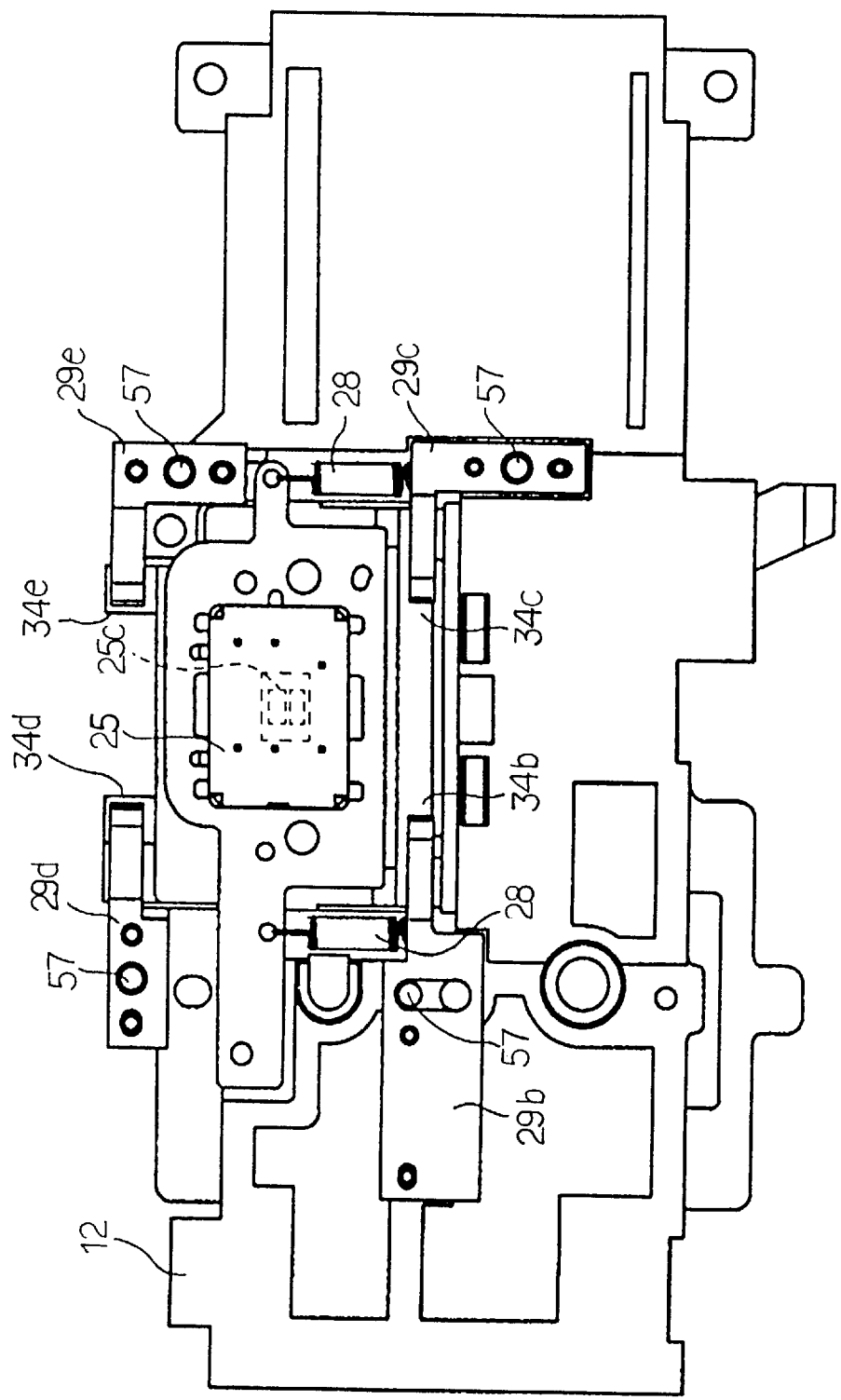
FIG. 13 is a backside view showing a pressure plate holder according to the third embodiment of the present invention.

FIG. 13 shows a third embodiment of the present invention. The same numbers are given to the same structures in the above-mentioned second embodiment, and different structures will be now explained hereinafter.

According to the third embodiment, four springs 29b, 29c, 29d, and 29e for pressing magnetic head are pressing respectively pressed parts 34b, 34c, 34d, and 34e formed on a head guide member 34 supporting a magnetic head 25. The pressed parts 34b, 34c, 34d, and 34e are arranged in a state that they are in symmetry to a perpendicular line with film feeding direction passing through a core portion 25c of the magnetic head 25. Therefore, as a balance of right and left becomes stable, a film surface and the core portion 25c of the magnetic head 25 is touching constantly, and a favorable magnetic writing and reading can be executed.

The present invention is not restricted within the above-mentioned embodiments but it may be embodied in other various forms without departing from the spirit or essential characteristics thereof.

For example, a construction that a unit of the magnetic head 25 is disposed on the pressure plate holder 12 through the head guide member 24 can be embodied in a varied forms as long as the magnetic head 25 is attached as to be movable in a perpendicular direction to a film surface.

Moreover, according to the camera of the above-mentioned embodiment, although the pressure plate 11 is employed, which is faced to overall backside plane of a film, in case that the present invention is installed on an apparatus such as a scanner, film player, and the like which reads out an image recorded on a film, an aperture may arranged at a position facing an image recording section and a pressure plate for guiding an envelop portion of the image recording section may be arranged backside of the film in order to illuminate an image recorded on the film.

What is claimed is:

1. An apparatus for use with a film having an information recording section, comprising:
   a body;
   a pressure plate for regulating a film position by sandwiching the film between the pressure plate and the body;
   a pressure plate holder fixed to the body and holding the pressure plate;
   a magnetic head; and,
   a head guide member disposed on the pressure plate holder and holding the magnetic head so that the magnetic head is movable in a perpendicular direction to a film surface.

2. The apparatus according to claim 1,
   wherein the apparatus is a camera.

3. The apparatus according to claim 1,
   wherein the apparatus is a film player which reads out an image recorded on the film.

4. The apparatus according to claim 1, further comprising a device for attaching the magnetic head for a film surface.

5. The apparatus according to claim 4,
   wherein the head guide member is connected with the pressure plate holder so that the head guide member can rotate on the pressure plate holder, and also move within a predetermined extent in a perpendicular direction to the film surface.

6. The apparatus according to claim 1,
   wherein the magnetic head is fixed to a holder plate disposed so as to be rotatable on the head guide member, and the holder plate comprises a pair of pins which attach an edge portion of the film and make the magnetic head contact at a fixed distance from the edge portion of the film.

7. The apparatus according to claim 1,
   wherein the magnetic head is unitedly disposed on a holder plate and a guide member is disposed on the holder plate, touching an upper or lower edge portion of a fed film for guiding the fed film.

8. An apparatus for use with a film having information recording section, comprising:
   a magnetic head;
   a head holder mechanism holding the magnetic head so that it can move in a perpendicular direction to a film surface; and,
   an attachment mechanism for pressing the head holder mechanism to a film side on at least three points around the magnetic head.

9. The apparatus according to claim 8,
   wherein the magnetic head has a magnetic recording unit at a plane touching the film, and the magnetic recording unit is positioned at the center of gravity of a shape that the pressing positions of the attachment mechanism are linked.

10. The apparatus according to claim 9,
    wherein the magnetic recording unit is arranged in a position where an integrated pressing force by the attachment mechanism interacts.

11. The apparatus according to claim 8,
    wherein the magnetic head has a magnetic recording unit at a plane touching the film, and the pressing positions of the attachment mechanism are arranged symmetrical to the magnetic recording unit in a perpendicular direction to a film feeding direction.

12. The apparatus according to claim 8, further comprising:
    a body;
    a pressure plate for regulating a film position by sandwiching the film between the pressure plate and the body;
    a pressure plate holder fixed to the body and holding the pressure plate.

* * * * *